March 29, 1949.   J. R. CHAPIN   2,465,708
IRRIGATION PIPE COUPLER
Filed June 26, 1947
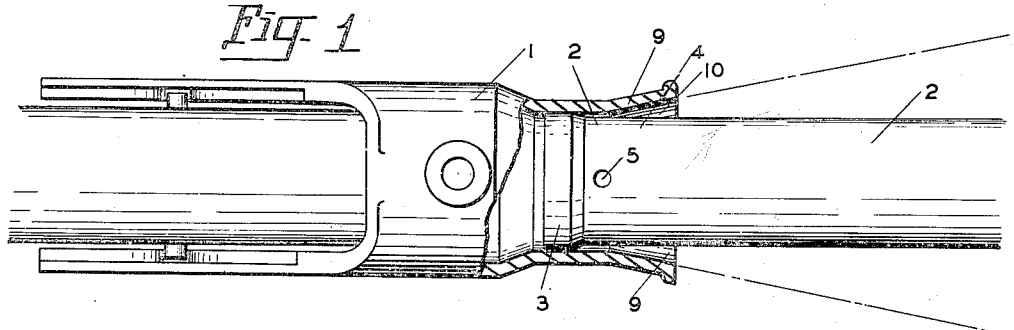
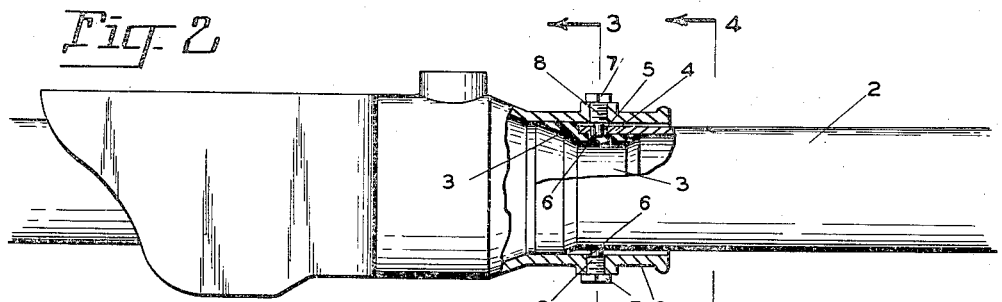
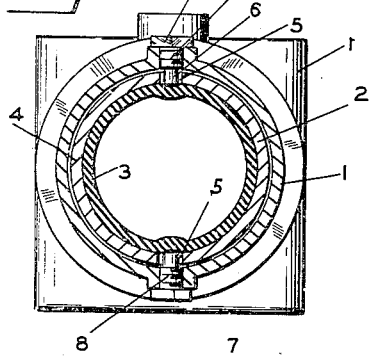
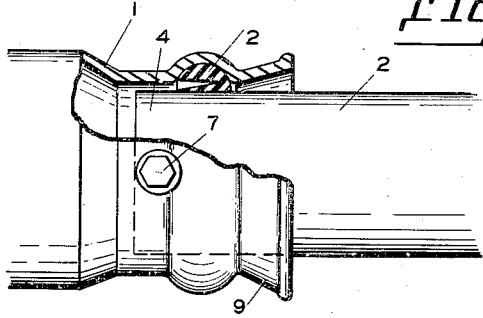
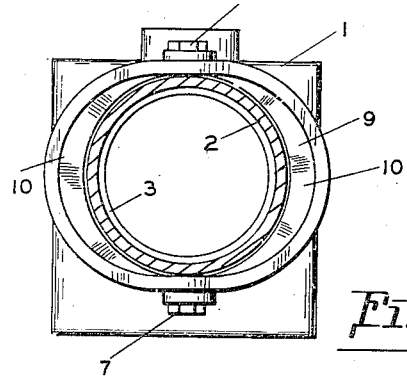
INVENTOR.
JACK R. CHAPIN
BY
ATTORNEY Patented Mar. 29, 1949

2,465,708

UNITED STATES PATENT OFFICE 2,465,708

IRRIGATION PIPE COUPLER

Jack R. Chapin, Salem, Oreg.

Application June 26, 1947, Serial No. 757,084

1 Claim. (Cl. 285—193)

This invention relates to irrigation pipe couplers and is an improvement over a co-pending application, Serial Number 753,517, which I have recently made application for, filed June 9, 1947.

The primary object of this invention is to provide for lateral movement of the pipe line relative to each joint. Heretofore the coupler has had one of its ends rigidly connected to one end of a pipe, but with my present improvement I have provided for rigidity between the coupler and the pipe relative to vertical movement of the coupler and a limited movement horizontally or laterally of the pipe in order to be able to make curved pipe lines.

The principles applied for in my co-pending application is such that this lateral or horizontal movement has been eliminated due to the principle of the coupler, therefore with the present application I provide for this lateral or horizontal movement of the coupler relative to the pipe.

These and other incidental objects will be apparent in the drawings, specification and claim.

Referring to the drawings:

Figure 1 is a plan view of my new and improved coupler partially broken away for convenience of illustration.

Figure 2 is a side view of the coupler partially broken away.

Figure 3 is an end sectional view, taken on line 3—3 of Figure 2, illustrating the method of connecting the coupler to the pipe.

Figure 4 is a sectional end view taken on line 4—4 of Figure 2 illustrating the shape of the end of the coupler which is to be fixedly applied to the end of the pipe.

Figure 5 is another preferred form of seal which can be readily adapted to my new and improved method of attaching a coupler to a pipe.

In the drawings:

1 is my new and improved coupler which is fixedly secured to the pipe 2 with my new and improved method of attaching the same. The rubber seal 3 is of a well known principle being inserted within the end 4 of the pipe.

Holes or openings 5 are located adjacent the end of the pipe and are adapted to receive the ends 6 of the pivot locks 7. The holes 5 and the pivots 7 are located on a vertical line relative to the coupler and are threaded into the coupler at 8. The pipe 2 is permitted to oscillate on the center line of the pivots as indicated by the broken lines in the plan view, Figure 1.

The end 9 of the coupler is flared on its sides at 10 but fits relatively close at 11 on its top and bottom of the pipe, as best illustrated in Figure 4. This oval shaped end supports and maintains the pipe in a straight line relative to vertical angle, but provides lateral movement of the pipe relative to horizontal angle. I do not wish to be limited to the oval shaped end of the coupler 1, as the end 6 of the pivots 7 register with the holes 5 on their vertical axis, thereby maintaining the pipe 2 on a fixed pivot point maintaining the same in a straight line with the coupler relative to the ground surface but will at the same time, as stated above, permit lateral movement of the pipe over the ground surface.

Referring to Figure 5, I have illustrated another preferred form of liquid seal indicated at 12 that can be adapted to my new and improved means of connecting the coupler to the pipe.

I do not wish to be limited to the exact mechanical structure as other mechanical equivalents may be substituted still coming within the scope of my claim.

What I claim is:

In combination, a pipe coupling comprising a hollow body formed at one end with a pair of spaced apart vertically disposed wings, each wing having a cam groove on its inner surface, the opposite end of the body being reduced in diameter and formed with a flared oval shaped end having its longest dimension disposed horizontally, vertically disposed threaded openings formed in the body adjacent the flared end, a pipe substantially equal in diameter to the short dimension of the oval end of the body and fitted and extended therein beyond the flared portion, diametrically disposed openings formed in said pipe in alignment with the diametrically disposed openings in the body, threaded elements having reduced ends, the threaded portions of the elements engaging the threaded openings in the body and the reduced ends engaging the openings in the pipe, packing between the end of the pipe and the body to form a seal, and a second pipe fitted between the wings in alignment with the first-mentioned pipe and having diametrically disposed pins at right angle to the threaded elements to engage the cam grooves in the wings, whereby the pipes can be tilted at an angle to each other.

JACK R. CHAPIN.

REFERENCES CITED

The following references are of record in the file of this patent:

UNITED STATES PATENTS

| Number | Name | Date |
|---|---|---|
| 445,250 | Lawless | Jan. 27, 1891 |
| 1,053,648 | Robinson | Feb. 18, 1913 |
| 1,117,961 | Phillips | Nov. 17, 1914 |